United States Patent
Kondo

(10) Patent No.: US 7,485,348 B2
(45) Date of Patent: Feb. 3, 2009

(54) METHOD FOR FORMING NANOSTRUCTURED CARBONS, NANOSTRUCTURED CARBONS AND A SUBSTRATE HAVING NANOSTRUCTURED CARBONS FORMED THEREBY

(75) Inventor: Yoshikazu Kondo, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 477 days.

(21) Appl. No.: 10/984,079

(22) Filed: Nov. 9, 2004

(65) Prior Publication Data

US 2005/0106094 A1  May 19, 2005

(30) Foreign Application Priority Data

| Nov. 17, 2003 | (JP) | ............................. 2003-386296 |
| Dec. 15, 2003 | (JP) | ............................. 2003-416030 |
| Apr. 2, 2004 | (JP) | ............................. 2004-109735 |

(51) Int. Cl.
*H05H 1/24* (2006.01)
(52) U.S. Cl. .................................. 427/569; 423/447.1
(58) Field of Classification Search .............. 427/248.1, 427/255.23, 569; 423/447.1
See application file for complete search history.

(56) References Cited

U.S. PATENT DOCUMENTS 6,221,330 B1 * 4/2001 Moy et al. ............... 423/447.3
2003/0113479 A1 * 6/2003 Fukuda et al. ............ 427/569

FOREIGN PATENT DOCUMENTS

JP     2002-220214      *  8/2002

OTHER PUBLICATIONS

Nozaki et al, Carbon nanotubes deposition in glow barrier discharge enhanced catalytic CVD, J. Phys. D:Appl. Phys. 35 (2002), p. 2779-2784.*
Meyyappan et al, Carbon nanotube growth by PECVD: a review, Plasma Sources Sci. Technol. Apr. 12, 2003, p. 205-216.*
Murakami et al, Direct synthesis of high-quality single-walled carbon nanotubes on silicon and quartz substrates, Chemical Physics Letters 377, Jul. 2003, p. 49-54.*

* cited by examiner

*Primary Examiner*—Timothy H Meeks
*Assistant Examiner*—Elizabeth A Burkhart
(74) *Attorney, Agent, or Firm*—Lucas & Mercanti, LLP

(57) ABSTRACT

A method for forming nanostructured carbons comprising the steps of: generating a plasma by supplying at least a discharge gas between opposing electrodes and applying a high-frequency voltage between the electrodes under an approximately atmospheric pressure; existing a material gas for forming the nanostructured carbons with the plasma to generate an activated material gas; and exposing a substrate to the activated material gas.

7 Claims, 4 Drawing Sheets

METHOD FOR FORMING NANOSTRUCTURED CARBONS, NANOSTRUCTURED CARBONS AND A SUBSTRATE HAVING NANOSTRUCTURED CARBONS FORMED THEREBY

RELATED APPLICATION

This application is based on patent applications Nos. 2003-386296, 2003-416030 and 2004-109735 filed in Japan, the entire content of which is hereby incorporated by reference.

BACKGROUND

1. Field of the invention

This invention relates to a method of forming nanostructured carbons and particularly, a method of forming said materials easily and quickly.

2. Description of the Related Art

Recently, a lot of researches and studies have been made on nanostructured carbons on the order of a few nanometers (nm) in diameter such as carbon nanotubes, carbon nanofibers, and graphite nanofibers. A carbon nanotube is a seamless tube made by wrapping a single planar sheet (called a graphene sheet) of 6-carbon rings. A single wall nanotube is made of a single graphene sheet. A multi-wall nanotube is made of a plurality of graphene sheets wrapped in a nested structure. Graphite nanofibers are composed of cylindrically laminated graphene sheets whose ends are cut into cone-shapes or integration of small pieces of graphene sheets aligned to the surfaces of catalyst metals used to produce the fibers.

When an electric field of a threshold value or greater is applied to a metal or semiconductor that is placed in a vacuum chamber, electrons pass through an energy barrier near the surface of the metal or semiconductor due to the quantum tunnel effect and as the result, electrons are emitted in vacuum even at ordinary temperatures. This electron emission due to this principle is called a cold cathode electron emission or simply called a field mission.

As the nanostructured carbons are excellent in various performances such as electron emission characteristic, heat resistance, and chemical stability, they have been expected to be employed as electron emission sources that apply the above electron emission principle to image display. Further, as the nanostructured carbons can also work as semiconductors and electric conductors, they have been expected to work as electric and electronic devices.

Conventionally, nanostructured carbons have been formed by the arc discharge process, thermal chemical vapor deposition (CVD) process, vacuum plasma process, or the like. For example, Japanese Non-Examined Patent Publication 2002-115071 discloses a method comprising steps of heat-treating a substrate having a thin catalyst metal film in vacuum and forming thin graphite nanofiber films on designated areas of the substrate selectively by the thermal chemical vapor deposition (CVD) process. Japanese Non-Examined Patent Publication 2001-64775 discloses a method of producing vertically-oriented carbon nanotubes on a substrate by modulating the output of a microwave by the time to generate plasma in a vacuum film-forming chamber.

The conventional arc-discharge and vacuum-plasma processes for forming nanostructured carbons respectively require a facility to vacuumize the equipment. This makes the equipment complicated and increases the equipment expenses and production costs. Further, the arc-discharge process is hard to make nanostructured carbons directly grown on a planar substrate. The processes can directly form nanostructured carbons only locally but cannot form them directly on a wide substrate at all. Furthermore, the rate of forming nanostructured carbons is very small which is assumed that the gas concentration is very low because the reaction is carried out in vacuum. Meanwhile, as the thermal CVD process must decompose the raw material by heat, the production temperature is very high (450 to 600° C.). Therefore, the substrates on which nanostructured carbons are to be directly formed must be very heat resistant and they are limited to ceramics and quartz glass. Naturally, this process is not applicable to substrates of ordinary glasses such as soda glasses and low alkali glasses (including non-alkali glasses) and plastic substrates.

SUMMARY

This invention has been made taking the above circumstances into consideration. The first object of this invention is to provide a method for forming nanostructured carbons easily and quickly. Its second object is to provide a method for forming nanostructured carbons on various kinds of substrates.

These and other objects are attained by the following 1) to 12).

1) A method for forming nanostructured carbons comprising the steps of:

generating a plasma by supplying at least a discharge gas between opposing electrodes and applying a high-frequency voltage between the electrodes under an approximately atmospheric pressure;

existing a material gas for forming the nanostructured carbons with the plasma to generate an activated material gas; and exposing a substrate to the activated material gas.

2) The method for forming nanostructured carbons of 1), wherein the frequency of the voltage applied between the electrodes is in the range of 0.5 kHz to 100 MHz.

3) The method for forming nanostructured carbons of 1), wherein at least one of the electrodes is covered with dielectric material.

4) The method for forming nanostructured carbons of 1), wherein a gas supplied between the electrodes contains 50% by volume or more of argon (Ar) and/or nitrogen ($N_2$) gas.

5) The method for forming nanostructured carbons of 1), further comprising attaching fine metallic particles to the substrate, wherein the nanostructured carbons are formed on the substrate to which fine metallic particles are attached.

6) The method for forming nanostructured carbons of 5), wherein the attaching comprises applying a solution containing an organic metal compound to the substrate and removing the organic component of the organic metal compound by decomposition.

7) The method for forming nanostructured carbons of 1), wherein the plasma is generated under an atmospheric pressure.

8) The method for forming nanostructured carbons of 1), wherein the electrodes are kept at 400° C. or lower.

9) The method for forming nanostructured carbons of 8), wherein the electrodes are kept at 300° C. or lower.

10) Nanostructured carbons formed by a method described in any of 1) to 9).

11) The Nanostructured carbons of 10), wherein the nanostructured carbons are carbon nanotubes.

12) A substrate having nanostructured carbons of 10) on the surface of the substrate.

In other words, we inventors deduced that, as nanostructured carbons are deposited on the surface of a substrate when the raw material for the nanostructured carbons and the catalyst are activated on the substrate surface, structural high-purity carbon materials can be deposited on the substrate surface without heating the whole substrate so high. We studied conditions of the atmospheric plasma process and found that the nanostructured carbons are formed easily and quickly under the conditions. This has led to this invention.

DESCRIPTION OF THE PREFERRED EMBODIMENT

Figure 1:
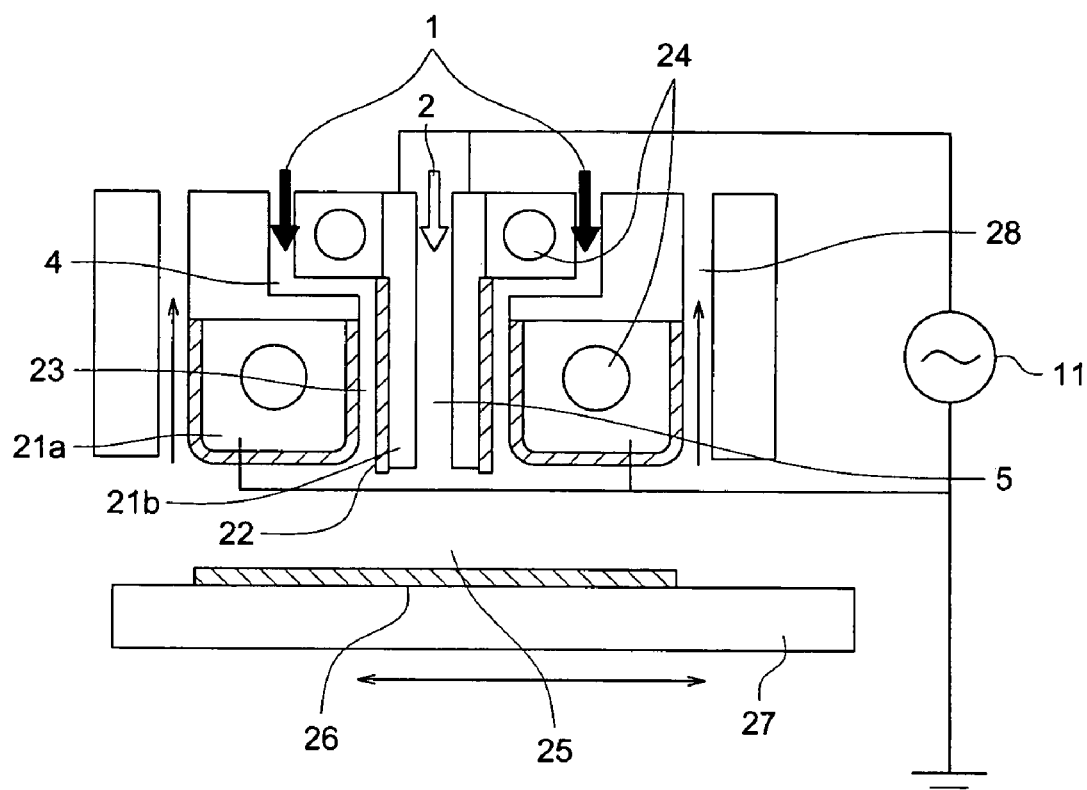
FIG. 1 shows a sectional view of atmospheric plasma processing equipment in accordance with this invention which contains an example of a gas inlet section and an electrode section.

This invention is characterized by a method for forming nanostructured carbons by an atmospheric plasma method comprising the steps of generating a plasma by applying a high-frequency voltage between opposing electrodes under the atmospheric or approximately atmospheric pressure.

The nanostructured carbons to be formed are carbon nanotubes, carbon nanofibers, and graphite nanofibers.

The atmospheric or approximately atmospheric pressure in this invention is about 20 to 110 kPa and preferably 93 to 104 kPa.

The high frequency applied to the electrodes in this invention is at least 0.5 kHz, preferably 5 kHz to 100 MHz, and more preferably 50 kHz to 50 MHz. It is also possible to apply different frequencies to the opposing electrodes as disclosed in Japanese Non-Examined Patent Publication 2004-68143.

The plasma processing equipment for the atmospheric plasma process used in this invention applies high frequency voltages between one or more pairs of opposing electrodes at least one of which is coated with a dielectric material, makes plasma discharges between the electrodes, turns a gas for forming nanostructured carbons into an excited gas (gas in plasma state), and exposes a substrate placed between the electrodes to the excited gas, and thus forms nanostructured carbons on the substrates. Jet-type equipment of another method is also available that makes plasmas discharge between the similar opposing electrodes, makes a gas for forming nanostructured carbons excited or in plasma state between the electrodes, jets the gas excited or in plasma state out of the opposing electrodes towards a substrate which is placed or carried near the electrodes, exposes the substrate to the jetted gas, and thus forms nanostructured carbons on the substrate.

The above atmospheric plasma processing equipment is equipped with a gas supplying means that supplies a discharge gas and/or a gas for forming nanostructured carbons to the space between the opposing electrodes. Further the equipment is preferably equipped with a means for controlling the electrode temperatures.

The gases supplied to the opposing electrodes (the discharging space) contain at least a discharge gas that is excited by the electric field and to be in plasma state. A gas for forming nanostructured carbons becomes excited by the discharge gas in plasma state and forms nanostructured carbons. The gas for forming nanostructured carbons receives energy from the discharge gas in plasma state, excites and activates itself with the energy, and deposits as nanostructured carbons chemically on the substrate. As the material itself is activated in this way, structural high-purity carbon materials can keep on depositing on the substrate without heating the substrate with a high temperature as in the thermal CVD process. In some cases, additional gases can be supplied.

The gas for forming nanostructured carbons can be any of hydrocarbon gases such as methane, fluorine carbonization compound, carbon oxides such as $CO_2$ and $CO$, alcohols, ketones, amides, sulfoxides, ethers, and esters, and preferably any of alcohols, hydrocarbon gases, and fluorine carbonization compounds.

The gas for forming nanostructured carbons can contain some additive gases if necessary. The additive gases can be any of hydrogen gas, steam gas, hydrogen peroxide gas, and fluorocarbon or hydro-fluoro carbon gas and preferably any of hydrogen gas, fluorocarbon gas, hydro-fluoro carbon gas, and steam gas.

The discharge gases can be nitrogen gas, rare gas, and hydrogen gas. These gases can be used singly or in combination. The rare gas can be any of elements belonging to the 18th group in the periodic table such as helium, neon, argon, krypton, xenon, and radon. Preferable discharge gases in this invention are argon (Ar) and nitrogen ($N_2$) gases. The gas supplied into the discharging space (between the opposing electrodes) should preferably contain 50% by volume or more of Ar or $N_2$ gas. The quantity of the discharge gas should preferably be 90 to 99.9% by volume of the whole gases supplied to the discharging space.

To deposit nanostructured carbons uniformly over the whole substrate, the quantity of the gas for forming nanostructured carbons should preferably be 0.01 to 10% by volume of the whole gases supplied to the discharging space and more preferably 0.01 to 1% by volume. Further, the gas for forming nanostructured carbons should preferably be 0.01 to 50% by volume of the-discharging gas.

The temperature of electrodes to form nanostructured carbons by the atmospheric plasma process should preferably be 400° C. or lower, more preferably be 350° C. or lower, and most preferably 300° C. or lower. In this way, as the rise of temperature can be suppressed while nanostructured carbons are formed, this process can use even low heat-resistance substrate materials such as non-alkali glasses or plastic substrates.

The nanostructured carbon forming process of this invention can use any of insulating, conductive, and semi-conductive substrates, for example, quartz glass, ceramic, metallic, and silicone substrates. As for glass substrates, this nanostructured carbon forming process can preferably use transparent glass substrates such as soda-lime glass, low-soda glass (including non-alkali glass), lead alkali silicate glass, and borosilicate glass substrates and more preferably substrates of high-strain-point low-soda glass (including non-alkali glass).

Preferable ceramics are alumina, zirconia, titania, silicon nitride, and silicon carbide.

Various kinds of resins can be used as the substrates as long as they are resistant to heat in the process. Such resins can be polyimide, fluorocarbon resin, polyether ether ketone (PEEK), poly ether sulfon (PES), poly parabanic resin, poly phenylene oxide, poly allylate resin, and epoxy resin. Among them, polyimide is preferable.

Further, heat-resistant slidable resins that assure heat resistance, slidability, and abrasion resistance can be used. Such resins are produced by adding filling materials such as glass fibers, glass beads, graphite, carbon fibers, fluorocarbon resin, molybdenum disulfide, and titanium oxide to resins such as polyamide resin, polyamide-imide resin, tetrafluoroethylene resin (PTFE), tetrafluoroethylene-perfluoroalkoxy-ethylene copolymer (PFA), tetrafluoroethylene-hexafluoro polypropylene co-polymer (FEP), high-temperature nylon resin, polyphenylene sulfide resin (PPS), trifluoro ethylene chloride resin (CTFP), modified phenol resin, polyethylene terephthalate resin (PET), poly buthylene terephthalate resin (PBT), and polyether ether ketone (PEEK). For example, such heat-resistant slidable resins are graphite-enriched polyimide resin, graphite-enriched nylon resin, PTFE-enriched acetal resin, and PTFE-enriched phenol resin.

The forming method can also use heat resistant resins made by adding filling materials such as glass fibers, glass beads, graphite, carbon fibers, fluorocarbon resin, molybdenum disulfide, and titanium oxide to base resins such as polyimide resin, polyamide resin, and polyamide-imide resin. These resins are resistant to 250° C. or higher. Further, the forming method can use heat-resistant resins made by adding the above filling materials to fluorocarbon resins. They can be used continuously at 250° C. or higher.

These resin substrates and composite substrates are used in sheets or films.

FIG. 1 shows a sectional view of atmospheric plasma processing equipment in accordance with this invention which contains an example of a gas inlet section and an electrode section. However, it is to be understood that the invention is not limited to this example. Further, although some terms in the description below contain assertive expressions, they are for the purpose of description of preferred embodiments and do not limit the meanings of terms and technical ranges of this invention.

Referring to FIG. 1, two pairs of electrodes 21a and 21b are placed in parallel and connected to a power source 11. At least one electrode of each electrode pair is coated with dielectric material 22. The power source 11 applies a high frequency voltage to a space 23 between each pair of electrodes. The electrode 21 contains a through-hole 24 through which water or oil flows and carries away excessive heat generated by discharging to keep the electrodes at a constant temperature by heat exchange.

A gas 1 containing a discharge gas is supplied to the space 23 through a flow path 4 by a gas supplying means (not shown in FIG. 1). When a high frequency voltage is applied to this space 23 and plasma discharges occur, the gas 1 in the space 23 is activated or in plasma state. The excited or activated gas 1 is jetted into a gas mixing space 25 in which the gas is mixed with a gas for creating nanostructured carbons.

Meanwhile, a mixture gas 2 containing the gas for forming nanostructured carbons is fed into the mixing space 25 through a flow path 5 by a gas supplying means (not shown in FIG. 1), mixed there with the discharge gas in plasma state, and jetted towards a substrate 26 which is placed on a moving stage 27. When touching the gas in plasma state, the gas for forming nanostructured carbons is activated by its energy and produces nanostructured carbons on the substrate 26.

This example of equipment is so constructed that the mixture gas 2 containing the gas for forming nanostructured carbons is sandwiched or enclosed by the activated discharge gas.

A moving stage 27 is so constructed as to be scanned reciprocally or continuously and further constructed to be able to heat-exchange to keep the substrate on it at a constant temperature in the manner similar to the electrodes. Further, it is also possible to provide a mechanism 28 for exhausting the gas that was jetted towards the substrate. This mechanism 28 can remove unwanted byproducts in the gas immediately from the discharging space and the vicinity of the substrate. Substrates of any shape (three dimensional or film-like substrates) besides sheet-like planar substrates can be used when the structure of the moving stage is changed according to the shape of substrate.

Figure 2:
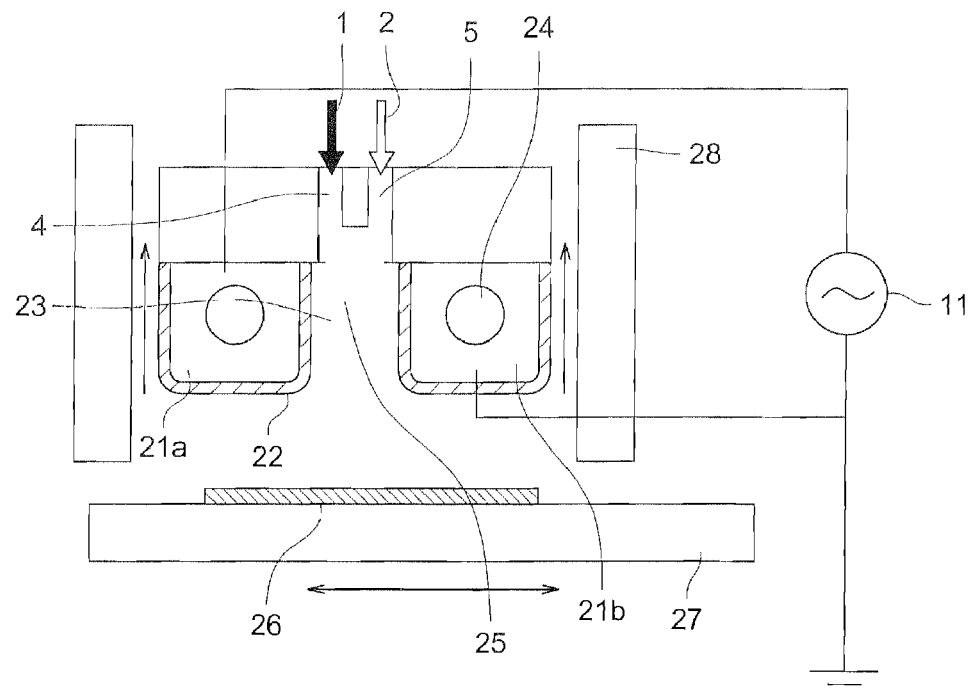
FIG. 2 shows a sectional view of atmospheric plasma processing equipment in accordance with this invention which contains another example of a gas inlet section and an electrode section.

This example of equipment is so constructed that the activated discharge gas merges with the mixture gas containing the gas for forming nanostructured carbons after discharging. This can prevent the nanostructured carbon product from depositing on the surfaces of electrodes. As this applicant proposed in Japanese Non-Examined Patent Publication 2003-095367, protective films covering the electrodes (see FIG. 2) enable mixture of the discharge gas and the gas for forming nanostructured carbons before discharging.

As disclosed in Japanese Non-Examined Patent Publication 2004-68143, the process can held with a plurality of power sources to apply different frequencies respectively to the opposing electrodes.

Further, the process can increase the nanostructured carbon production capacity by arranging these pieces of equipment along the scanning direction of the stages. Furthermore, the stage and electrodes of the equipment can be wholly sealed to shut out ambient air to keep the gas composition stable in the equipment and to produce desired high-quality nanostructured carbons.

Figure 3:
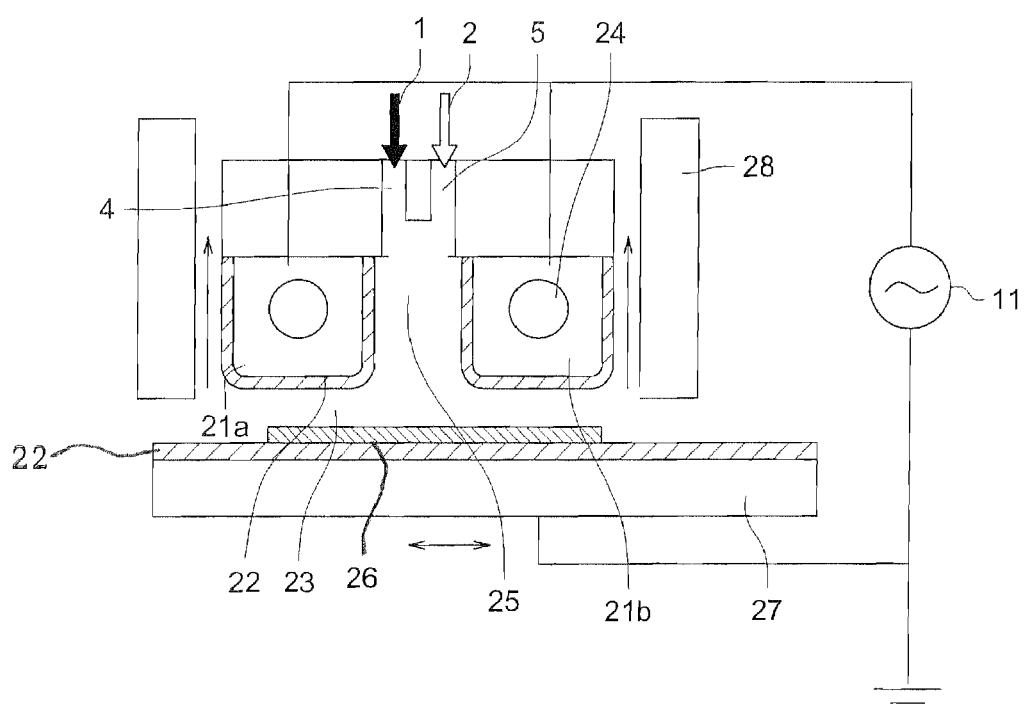
FIG. 3 shows a sectional view of another example of atmospheric plasma processing equipment.

FIG. 3 shows another example of plasma processing equipment.

In this example of equipment, the moving stage 27 works as one kind of electrodes and another kind of electrodes 21a and 21b are provided in parallel to each other opposite the moving stage 27 (as an electrode). The electrodes 21a and 21b are connected to a power source 11. At least one kind of these electrodes 21a, 21b, and 27 is coated with a dielectric material 22. A high-frequency voltage is applied from the power source 11 to the space 23 between the electrodes 21 and 27. Each of the electrodes 21 and 27 contains a through-hole 24 through which water or oil flows and carries away excessive heat generated by discharging to keep the electrodes at a constant temperature by heat exchanging.

Gas supplying means (not shown in FIG. 3) feed a gas 1 containing the discharge gas to the mixing space 25 through a flow path 4 and a mixture gas 2 containing the gas for forming nanostructured carbons to the mixing space 25 through a flow path 5. These gases 1 and 2 are mixed in the mixing space 25 and sent to a space 23 between electrodes 21 and 27 through a space between the electrodes 21a and 21b. When a high-frequency voltage is applied to the space 23, the discharge gas is plasma-excited or activated. The gas for forming nanostructured carbons is activated by the energy of this discharge gas in plasma state and produces nanostructured carbons on the substrate 26.

A sputter deposition by the atmospheric plasma process is enabled by changing the electrodes 21a and 21b of this equipment to a sputtering target such as Fe, Cr, and Ni. In this case, the electrode 27 requires a dielectric material 22 and a clearance between the electrodes 21 and the base material 26 should preferably be 5 mm or less.

Figure 4:
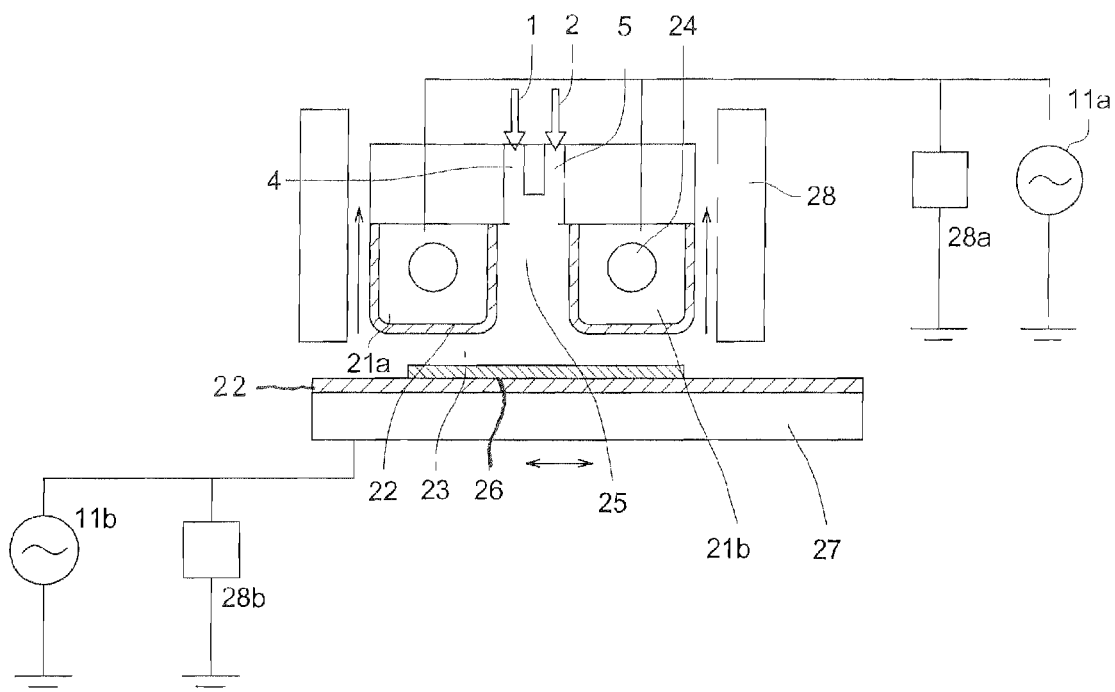
FIG. 4 shows a sectional view of still another example of atmospheric plasma processing equipment.

FIG. 4 shows still another example of atmospheric plasma processing equipment.

The electrodes 21a and 21b are made by coating the metallic base materials with a dielectric material 22 and respectively have a through-hole 24 through which water or oil flows to keep the surface temperature of the electrodes constant at a preset temperature by heat exchanging.

A moving stage 27 is provided opposite the electrodes 21a and 21b and a discharging space 23 is formed between the stage 27 and the electrodes 21a and 21b. The moving stage 27 as well as the electrodes 21a and 21b is coated with a dielectric material 22 and can have a through-hole (a hollow structure) that can flow a cooling medium to control its surface temperature if necessary.

Preferred base materials for the above electrodes are selected, for example, from a group of silver, platinum, stainless steel, aluminum, and iron. Stainless steel and titanium are preferable because they can be machined easily.

The dielectric material should preferably be an inorganic compound whose relative dielectric constant is 6 to 45. Such dielectric materials can be ceramic such as alumina and silicon nitride or glass lining materials such as silicate glass and borate glass. Among them, a thermal-sprayed aluminum dielectric material is preferable. It is sealed if necessary.

The distance between the opposing electrodes (electrode clearance) is dependent upon the thickness of the dielectric material that coats the conductive metallic base material, the thickness of a substrate, the magnitude of a high-frequency voltage to be applied, and the purpose to use plasma. When one of the electrodes is coated with a dielectric material, the shortest distance between the surfaces of the dielectric material should preferably be 0.1 to 20 mm and more preferably 0.5 to 2 mm for discharging uniformly. Similarly, when both electrodes are coated with a dielectric material, the distance of surfaces of dielectric materials should preferably be 0.1 to 20 mm and more preferably 0.5 to 2 mm.

Cheap gases such as Ar and $N_2$ are preferable because they can reduce the nanostructured carbon production cost. It is possible to generate high-energy plasma using such gases by applying different frequencies to the opposing electrodes (first and second electrodes) as shown in the atmospheric plasma processing equipment of FIG. 4.

The first electrodes 21a and 21b are connected to a high frequency power source 11a (also called the first power source) that applies the first high frequency voltage of voltage $V_1$ and frequency $\omega_1$. The second electrode which is the moving stage electrode 27 is connected to another high frequency power source 11b (also called the second power source) that applies the second high frequency voltage of voltage $V_2$ and frequency $\omega_2$.

Preferable first power sources that are commercially available are listed below.

| Power source symbol | Manufacturer | Frequency | Product name |
| --- | --- | --- | --- |
| A1 | Shinko Electric Co., Ltd | 3 kHz | SPG3-4500 |
| A2 | Shinko Electric Co., Ltd | 5 kHz | SPG5-4500 |
| A3 | Kasuga Ew Co., Ltd | 15 kHz | AGI-023 |
| A4 | Shinko Electric Co., Ltd | 50 kHz | SPG50-4500 |

-continued

| Power source symbol | Manufacturer | Frequency | Product name |
| --- | --- | --- | --- |
| A5 | Haiden Laboratory Inc. | 100 kHz* | PHF-6k |
| A6 | Pearl Kogyou Co., Ltd. | 200 kHz | CF-2000-200k |
| A7 | Pearl Kogyou Co., Ltd. | 400 kHz | CF-2000-400k |

These power sources are all available as the first power source to the atmospheric plasma processing equipment.

Preferable second power sources (as high frequency sources) that are commercially available are listed below.

| Power source symbol | Manufacturer | Frequency | Product name |
| --- | --- | --- | --- |
| B1 | Pearl Kogyou Co., Ltd. | 800 kHz | CF-2000-800k |
| B2 | Pearl Kogyou Co., Ltd. | 2 MHz | CF-2000-2M |
| B3 | Pearl Kogyou Co., Ltd. | 13.56 MHz | CF-5000-13M |
| B4 | Pearl Kogyou Co., Ltd. | 27 MHz | CF-2000-27M |
| B5 | Pearl Kogyou Co., Ltd. | 150 MHz | CF-2000-150M |

These power sources are all preferably available as the high frequency sources.

The power source marked with an asterisk (*) is a Haiden Laboratory impulse high-frequency power source (100 kHz in Continuous mode). Other power sources are all high-frequency power sources that can supply continuous sine waves only.

The first high frequency voltage of $V_1$, frequency $\omega_1$, the second high frequency voltage $V_2$, frequency $\omega_2$ and the discharge starting voltage VI are preferably satisfy the following 1) to 3) conditions.

1) $\omega_2 > \omega_1$
2) $V_1 \geqq IV > V_2$ or $V_1 > IV \geqq V_2$
3) the output density of the second high-frequency field is 1 watt/$cm^2$ or more A high frequency is at least 0.5 kHz or higher.

When high-frequency fields of sine waves are overlapped, the frequency w1 of the first high-frequency field is overlapped with the frequency $\omega_2$ of the second high-frequency field which is higher than the frequency $\omega_1$. Its waveform is saw-toothed in which the sine wave of frequency $\omega_2$ is overlapped on the sine wave of frequency $\omega_1$.

The frequency of the first power source should preferably be 200 kHz or less. The field waveform can be any of a continuous wave and a pulse wave. The low limit of the frequency should preferably be about 1 kHz.

Similarly, 800 kHz or higher is preferably used as the frequency of the second power source. As the frequency of the second power source goes higher, the plasma density becomes greater and the resulting film becomes denser and finer. The upper limit of the frequency of the second power source should preferably be about 200 MHz.

It is preferable to connect a first filter to the first electrode, the first power source, or between them and a second filter to the second electrode, the second power source, or between them. The first filter should work to enable the current of the first high frequency field to flow from the first power source to the first electrode, to ground the current of the second high frequency field, and to suppress the flow of current of the second high frequency field from the second power source to the first power source. Contrarily, the second filter should work to enable the current of the second high frequency field to flow from the second power source to the second electrode, to ground the current of the first high frequency field, and to suppress the flow of current of the first high frequency field from the first power source to the second power source. "To suppress the flow of current" means to flow preferably 20% or less of the current and more preferably 10% or less of the current. Similarly, "to enable the flow of current" means to flow preferably 80% or more of the current and more preferably 90% or more of the current.

When the above conditions are satisfied, even a discharge gas having a high discharge starting voltage such as nitrogen gas can start discharging and keep a high dense and stable plasma status. This enables a film formation of high performance.

The first filter 28a is provided between the electrode 21 and the first power source 11a. The first filter 28a is designed to enable the flow of a current from the first power source 11a to the electrodes 21a and 21b, to ground the current of the second power source 11b, and to suppress the flow of a current from the second power source to the first power source. The second filter 28b is provided between the moving stage electrode 27 and the second power source 11b. The second filter 28b is designed to enable the flow of a current from the second power source 11b to the moving stage electrode 27, to ground the current of the first power source 11a, and to suppress the flow of a current from the first power source to the second power source. The first filter 28a can be a capacitor of some tens to some ten thousands pF depending upon the frequency of the second power source or a coil of about several microhenries. The second filter 28b can be a capacitor of 10 microhenries depending upon the frequency of the first power source. These coils or capacitors can be used as filters when they are grounded.

The discharge output of a voltage applied between electrodes (to the discharge space) should preferably be 1 watt/cm and more preferably 1 to 50 watts/cm$^2$.

The equipment mixes the mixture gas 2 containing a gas for forming nanostructured carbons (indicated by a white arrow) and the gas 1 containing the discharge gas (indicated by a black arrow) and blows the mixed gas towards the substrate 26. After hitting the substrate 26, the mixed gas moves along the surface of the substrate 26 in the discharge space, and then goes out of the equipment.

To facilitate formation of nanostructured carbons, this invention preferably provides a process of attaching fine metal particles to the surface of a substrate before forming nanostructured carbons on the surface of the substrate.

Available metals can be those that work as catalysts in production of graphite, vapor-phase cracking, and growth of carbon nanotubes. Specifically, the metals can be a single metal or a mixture of one or more metals selected from a set of iron group metals such as Ni, Fe, and Co, platinum group metals such as Pd, Pt, and Rh, rare-earth group metals such as La and Y, transition metals such as Mo and Mn, and compounds of these metals. Ni, Fe, Mo, Co, and Mn are preferable among these catalytic metals and can be used singly or in combination. Other metals such as Ti and Al can be added as a supporting material to the above catalytic metals.

Any process can be used to attach fine metallic particles to the surfaces of substrates as long as it can attach fine metallic particles to substrate surfaces. Naturally, the above explained atmospheric plasma process can be used. This process requires only a simple device configuration to attach fine metallic particles to substrate surfaces.

The mainly process for attaching fine metallic particles to substrate surfaces are two: thermal chemical vapor deposition (CVD) method and sputter deposition method. The sputter deposition method uses targets of metals as already explained. The CVD method can use, as a raw material, a volatile organic metallic compound such as a metal complex of alcoxide or beta diketone. These materials are turned into vapor by a vaporizer or evaporator, diluted by a discharge gas or additive gas, and fed to the plasma space.

The process for attaching fine metallic particles to substrate surfaces in accordance with this invention should preferably contain a process that applies a solution containing a selected metallic compound to substrate surfaces, decomposes and removes non-metallic components from the metallic compound. The metallic compound can be any of organic and inorganic compounds. The inorganic metallic compound can contain metal halides and metal hydroxides.

Organic metallic compounds are preferable as the metallic compounds to be attached to substrate surfaces. It is assumed that, when an organic metallic compound is used, fine metallic particles are disposed at proper intervals on the substrate surface without coagulation of metallic particles. When the process uses an organic metallic compound, the process that removes non-metallic compound from the organic metallic compound is equivalent to the process that decomposes and removes organic components from organic metallic compounds.

The method for applying a solution containing a selected metallic compound to substrate surfaces can be any of well-known coating methods such as a dip coating method (dipping method), a bar coating method, a slot coating method, a slide coating method, a curtain coating method, a gravure coating method, a web tension method, an air doctor method, and a spray coating method.

An additive such as a surface active agent and a proper binder can be added to a solution containing a selected metallic component when the solution is applied to substrate surfaces.

A means to decompose and remove non-metallic components from a metallic compound can be any of well-known processes such as a plasma processing, a flame processing, a corona processing, a UV processing, an electron beam processing, a high temperature processing, but the high temperature processing and the plasma processing are preferable for this invention.

Any organic metallic compound can be used as long as it contains a selected metal element. Available organic metallic compounds can be, for example, alkyl compounds, allyl compounds, cyclo-pentadienyl compound and compounds having the similar structure, organic salts such as alcoxide and carboxylate, and organic metal complex.

In accordance with this invention, the organic metal compound should preferably be an organic metal complex. Such organic metal complexes are metallic carbonyl complex compound, isonitrile complex compound, complex salt of dioxyl compound, oxyaldehyde complex salt, oxyketone complex salt, oxyquinone complex salt, oxy acid complex salt, oxyester complex salt, diketone oxime complex salt, o-oxybenzyl-amine complex salt, 8-oxyquinoline complex salt, 1-oxyacridine complex salt, oxybenxoquinoline complex salt, oxyphenazine complex salt, oxyazo complex salt, nitrosonaphthol complex salt, oxyquinoline-N-oxido complex salt, amino acid complex salt, anthranilic acid complex salt, quinaldic acid complex salt, phenazine-N-carboxylic acid complex salt, nitrosohydroxylamine complex salt, triazene complex salt, dithizone complex salt, dipylidil complex salt, phenanthroline complex salt, salicylaldehyde-o-oxyphenyl-imine copper, bis-(salicylaldehyde)ethylene-di-imine complex salt, phthalocyanine complex salt, porphin complex salt, porphyrin complex salt, vitamin $B_{12}$, tri-salicylaldehyde-di-imine complex salt, ethylenediaminetetraacetic acid complex salt, 1,8-bis-(salicylideneamino)-3,6-dithiaoctane complex salt, metal complex compound of olefins, metal complex compound of cyclopentadienyl, metal complex compound of aromatic hydrocarbons, and so on.

Complex salts of dioxy compounds can be, for example, beta diketones such as acetyl acetone (acac) complex, dipiparoylmethane (DPM) complex, 2,6-dimethyl-3,5-heptanedion (DMHD) complex, and the like.

Any solvent can be used to make a solution. Such solvents can be, for example, water, aliphatic hydrocarbons (heptane, petroleum benzene, cyclohexane, etc.), aromatic hydrocarbons (benzene, xylene, ethylbenzene, etc.), halogenated hydrocarbons (methylene chloride, carbon tetrachloride, trichloroethane, etc.), alcohols (methanol, ethanol, n-propanol, etc.), ethers (ethyl ether, tetrahydrofuran, etc.), ketones (methyethylketone, cyclohexanone, etc.), esters (methyl formate, n-propyl acetate, etc.), polyvalent alcohol derivatives (ethylene glycol monoethyl ether, etc.), fatty acids (acetic acid, etc.), phenols (phenols, etc.), and compounds containing nitrogen or sulfur. These solvents can be used singly or in combination.

The method of this invention uses the atmospheric plasma process at least for the nanostructured carbon forming process.

The method of this invention can use general cheap substrates such as soda glass, low-soda glass (including non-alkali glass), and plastic substrates because the method need not use high temperatures to form nanostructured carbons. Therefore, this method is very effective to produce, for example, electron emission sources for field-emission displays (FED) whose mass production is requested by forming nanostructured carbons on glass or plastic substrates. Various applications of the field emission effect are expected in various fields such as display units, electron beam sources, and micro vacuum tubes.

For production of said electron emission sources and the like, each substrate for them should preferably be coated with a conductive film that works as an electrode. Specifically, the conductive film is made of metal such as Al, Ru, and Cu or ITO film.

EXAMPLE 1

Process of Attaching Fine Metal Particles to Substrate Surfaces

Figure 5:
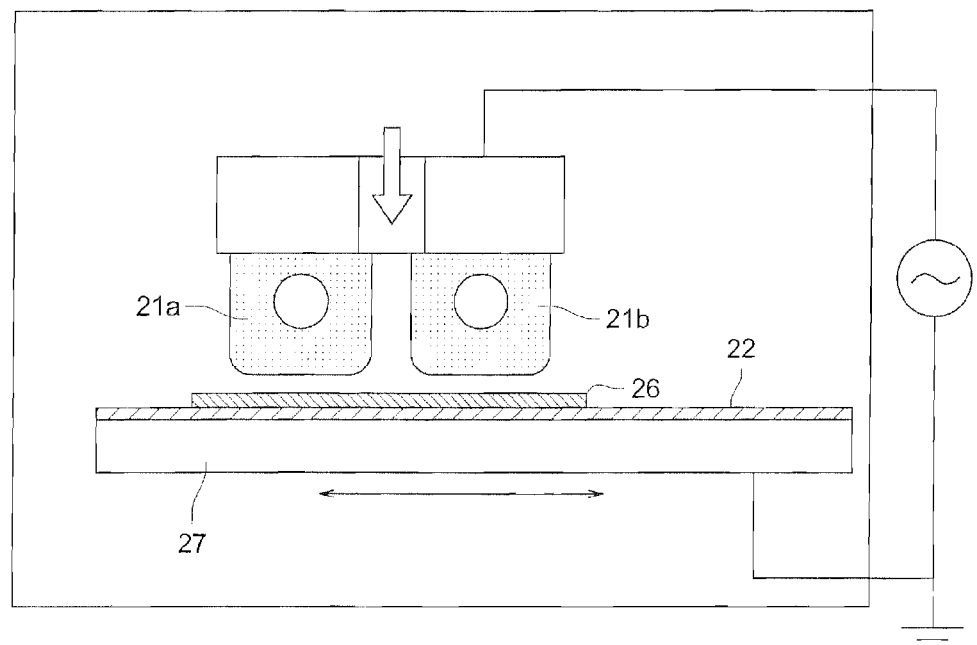
FIG. 5 shows an example of an equipment configuration used for the process of attaching fine metal particles to substrate surfaces in accordance with the examples.

We attached fine metal particles to substrate surfaces by using equipment having a configuration of FIG. 5.

We prepared pure-iron (Fe) targets of 20 mm×20 mm×120 mm (long) as the electrodes 21a and 21b. Each target had its edges rounded (R3) and contained a through-hole through which silicone oil flowed to control the electrode temperature by heat exchange.

The moving stage electrode 27 was made of a titanium plate (JIS Class 2 titanium) of 100 mm×500 mm×20 mm and had three through-holes to control the electrode temperature. The surface of this electrode was coated with alumina ceramic by thermal spraying to have a ceramic coat of 0.8 mm thick. Then a dielectric layer 22 was formed on the alumina ceramic layer of the stage electrode by applying an organic solution of alkoxysilane monomer to the alumina ceramic layer, drying thereof, and sealing thereof at 300° C.

We arranged two of the above targets to form a clearance of 2 mm wide between them so that the discharge gas might flow through this clearance. We placed these targets 21a and 21b above the moving stage electrode 27 with a clearance (D) of 1.0 mm between the electrodes 21 and 27. Then we placed this nanostructured carbon fabricating unit in a container that had a gas exhaust path.

We placed a non-alkali glass plate of 100 mm×100 mm×0.5 mm (thick) as a substrate 26 between the electrodes and moved the stage electrode 27 reciprocally at a speed of 0.1 m/sec.

We flowed silicon oil through the through-holes of the electrode and the targets to keep the surface temperatures of the electrode and the targets at 250° C., purged away air from the space between electrodes with Ar gas for about 10 minutes, and then applied a high frequency of 13.56 MHz to the space between the electrodes and the targets to make plasma discharging at 20 watts/cm$^2$. After plasma discharging of 60 seconds, fine Fe particles were deposited on the substrate.

Process of Forming Nanostructured Carbons on Substrate Surfaces

Figure 6:
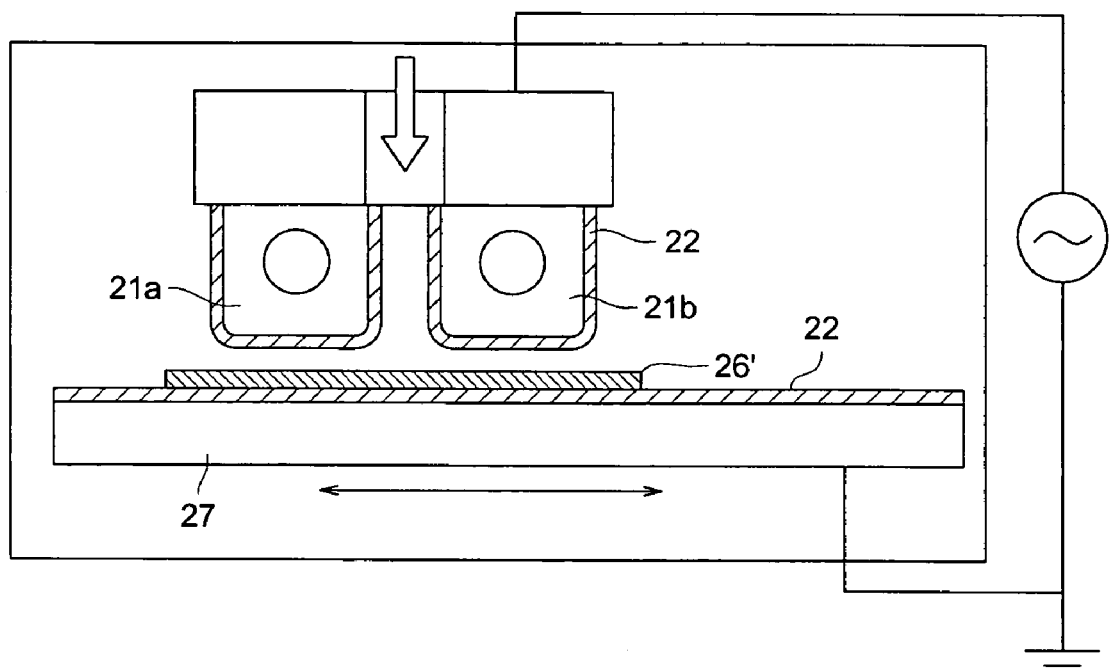
FIG. 6 shows an example of an equipment configuration used for the process of forming nanostructured carbons substrate surfaces in accordance with the examples.

We formed nanostructured carbons on the substrate 26' which was covered with fine metal particles by using the equipment having a configuration of FIG. 6.

We prepared, as electrodes 21a and 21b, titanium bars (JIS Class 2 titanium) of 20 mm×20 mm×120 mm (long). Each electrode bar had its edges rounded (R3) and contained a through-hole for heat exchange. The surface of each electrode bar was coated with alumina ceramic by thermal spraying to have a ceramic coat of 0.8 mm thick. Then a dielectric layer 22 was formed on the alumina ceramic layer of each electrode bar by applying an organic solution of alkoxysilane monomer to the alumina ceramic layer, drying thereof, and sealing thereof at 300° C.

We arranged two of the above electrode bars to form a clearance of 2 mm wide between them so that the raw material gas containing the discharge gas might flow through this clearance. We used the same moving stage electrode 27 as what was prepared for the metal particle attaching process. We placed these electrode bars 21a and 21b above the moving stage electrode 27 with a clearance (D) of 1.5 mm between the electrodes 21 and 27. Then we placed this nanostructured carbon fabricating unit in a container that had a gas exhaust path.

We put a heater in each electrode, kept each electrode at 300° C., purged away air from the space between electrodes with an Ar mixture gas that contains 0.2% by volume of $CO_2$ gas and 4% by volume of $H_2$ gas besides Ar gas for about 10 minutes, and then applied a high frequency of 13.56 MHz to the space to make plasma discharging at 25 watts/cm$^2$ for 600 seconds.

Just before depositing nanostructured carbons on a substrate located between the electrodes, the surface temperature of the substrate was measured with a non-contact handy type thermometer IT2-80 (fabricated by Keyence Inc.). The temperature was 230° C.

By observing the surface of the substrate by a scanning electron microscope (SEM), we found that multiple layers of carbon materials of carbon nanotubes grew on the layer of fine catalytic metal particles on the substrate.

(Evaluation)

We measured the Raman scattering spectra of the obtained specimens and found that they showed spectra specific to carbon nanotubes, that is, great peaks were found in the G band (Graphite band of 1590 cm$^{-1}$) and the D band (Disorder band of 1360 cm$^{-1}$).

EXAMPLE 2

Example of using a Substrate having a Conductive Layer on it

The metal particle attaching process and the nanostructured carbon fabricating process of this example are the same as those of Example 1 but Example 2 uses a substrate having a conductive layer on it. Example 2 could also get carbon materials of carbon nanotubes almost similar to those obtained by Example 1. A conductive layer was formed on the substrate as follows:

We placed a base material on the moving stage electrode 27 in the equipment of FIG. 5 (having electrodes coated with dielectric material) and purged the gas in the container with nitrogen gas until the concentration of oxygen gas in the container becomes 50 ppm.

We fed a mixture gas of 95.9% by volume of nitrogen gas, 0.1% by volume of aluminum acetyl acetate vapor, and 4% by volume of hydrogen gas into the equipment and applied a high frequency voltage of 50 kHz, 8 KV to one of the electrodes and a high frequency voltage of 13.56 MHz, 8 watt/$cm^2$ to the other electrode as disclosed by Japanese Non-Examined Patent Publication 2004-68143.

We processed for 600 seconds while moving the second electrode reciprocally at a speed of 0.5 cm/sec. An aluminum layer of 300 nm thick was formed on the substrate.

We measured the concentration of oxygen by Toray oxygen analyzer.

We fed the aluminum acetyl acetate vapor by making the aluminum acetyl acetate solution bubbled by nitrogen gas at 230° C.

Although this example used an aluminum layer, any layer can be used as long as it is conductive.

EXAMPLE 3

We formed nanostructured carbons on a substrate having a conductive layer on it in the manner similar to Example 1 by using the equipment configuration of FIG. 4.

We prepared, as electrodes 21a and 21b, titanium bars (JIS Class 2 titanium) of 20 mm×20 mm×120 mm (long). Each electrode bar had its edges rounded (R3) and contained a through-hole for heat exchange. The surface of each electrode bar was coated with alumina ceramic by thermal spraying to have a ceramic coat of 0.8 mm thick. Then a dielectric layer 22 was formed on the alumina ceramic layer of each electrode bar by applying an organic solution of alkoxysilane monomer to the alumina ceramic layer, drying thereof, and sealing thereof at 300° C.

We arranged two of the above electrode bars to form a clearance of 2 mm wide between them so that the raw material gas containing the discharge gas might flow through this clearance. We used the same moving stage electrode 27 as what was prepared for the metal particle attaching process. We placed these electrode bars 21a and 21b above the moving stage electrode 27 with a clearance (D) of 1.5 mm between the electrodes 21 and 27. Then we placed this nanostructured carbon fabricating unit in a container that had a gas exhaust path.

We put a heater in each electrode, kept each electrode at 300° C., purged away air from the space between electrodes with an $N_2$ mixture gas that contained 0.2% by volume of $C_2H_2$ gas and 4% by volume of $H_2$ gas besides $N_2$ gas for about 10 minutes, and then applied a high frequency voltage of 50 kHz, 8 KV to one of the electrodes and a high frequency voltage of 13.56 MHz, 10 watt/$cm^2$ to the other electrode for 600 seconds as disclosed by Japanese Non-Examined Patent Publication 2004-68143.

Just before depositing nanostructured carbons on a substrate located between the electrodes, the surface temperature of the substrate was measured with a non-contact handy type thermometer IT2-80 (fabricated by Keyence Inc.). The temperature was 230° C.

By observing the surface of the substrate by a scanning electron microscope (SEM), we found that multiple layers of carbon materials of carbon nanotubes grew on the layer of fine catalytic metal particles on the substrate as well as Examples 1 and 2.

Using the same equipment, we used an Ar mixture gas that contains 0.2% by volume of CO gas and 4% by volume of $H_2$ gas besides the Ar gas, and then applied a high frequency voltage of 50 kHz, 8 KV to one of the electrodes and a high frequency voltage of 60 MHz, 10 watt/$cm^2$ to the other electrode for 300 seconds as disclosed by Japanese Non-Examined Patent Publication 2004-68143. Also by this test, we could get carbon materials of carbon nanotubes similar to those of the above examples.

EXAMPLE 4

We prepared an ethanol solution containing 0.05% by weight of molybdenum acetate II (fabricated by Kanto Kagaku) and 0.05% by weight of cobalt acetate II tetrahydrate (fabricated by Kanto Kagaku), dipped a low-soda glass plate of 100 mm×100 mm×0.5 mm (fabricated by Corning), and pulled it up at a speed of 1 cm/minute.

We kept this dip-coated low soda glass substrate at 350° C. in a furnace for 20 minutes to remove organic components from the dipped layer on the substrate. Then we formed nanostructured carbons on this substrate covered with fine metal particles by using equipment of the configuration shown in FIG. 3.

We kept the electrodes 21 at 90° C. by flowing hot water through the electrodes 21. We also kept the surface temperature of the substrate at 300° C. by heating with a heater provided in the hole of the moving stage electrode 27. We fed an Ar mixture gas containing 4% by volume of hydrogen gas besides the Ar gas to the space between the electrodes through the gas flow path to purge for 10 minutes. After purging, we stopped supplying hydrogen gas, fed an Ar mixture gas containing 0.2% by volume of ethanol to the space between electrodes, and applied a high frequency of 13.56 MHz, 10 watts/$cm^2$ to the space between electrodes 21 and 27 for 300 seconds to make plasma discharging.

We measured the Raman scattering spectra of the obtained specimens by a JASCO Raman scattering spectrochemical analyzer and found a peak near at 1590 $cm^{-1}$ called a split G-band that indicates the existence of single-layer carbon nanotubes, a peak at 1350 $cm^{-1}$ called a D-band that indicates the existence of byproducts such as amorphous carbon and multilayer carbon nanotubes, and a peak near at 200 $cm^{-1}$ that indicates the distribution of diameters of SWNT due to the radial breathing mode (RBM) of a single layer carbon nanotubes (SWNT). The height of the D-band peak is about 1/60 of the height of the G-band peak. This means that the single-layer carbon nanotubes were formed efficiently. By observing the surface of the substrate by a scanning electron microscope (SEM), we found a carbon structure assumed to be single-layer carbon nanotubes (SWNT) vertically formed on the whole surface of the substrate.

The SWNT is formed in about 5 to 10 minutes, which is faster by 10 times or more than the speed of formation of the SWNT by the well-known thermal CVD method.

EFFECTS OF THE INVENTION

In accordance with this invention, nanostructured carbons can be formed by the atmospheric plasma process without a vacuuming facility or the like and formed also on substrates which are not so heat resistant.

It is to be noted that various changes and modifications will be apparent to those skilled in the art. Therefore, unless such changes and modifications depart from the scope of the present invention, they should be construed as being included therein.

What is claimed is:

1. A method for forming nanostructured carbons comprising the steps of:
   generating a plasma by supplying at least a discharge gas between opposing electrodes and applying a high-frequency voltage between the electrode under an approximately atmospheric pressure;
   existing a material gas for forming the nanostructured carbons with the plasma to generate an activated material gas;
   attaching fine metallic particles to a substrate; and
   exposing the substrate to the activated material gas;
   wherein the electrodes are kept at 400° C. or lower.

2. The method for forming nanostructured carbons of claim 1, wherein the frequency of the voltage applied between the electrodes is in the range of 0.5 kHz to 100 MHz.

3. The method for forming nanostructured carbons of claim 1, wherein at least one of the electrodes is covered with dielectric material.

4. The method for forming nanostructured carbons of claim 1, wherein a gas supplied between the electrodes contain 50% by volume or more of argon (Ar) and/or nitrogen ($N_2$) gas.

5. The method of forming nanostructured carbons of claim 1, wherein the step of attaching fine metallic particles to the substrate comprises applying a solution containing an organic metal compound to the substrate and removing the organic component of the organic metal compound by decomposition.

6. The method for forming nanostructured carbons of claim 1, wherein the plasma is generated under an atmospheric pressure.

7. The method for forming nanostructucred carbons of claim 1, wherein the electrodes are kept at 300° C. or lower.

* * * * *